United States Patent Office 3,065,278
Patented Nov. 20, 1962

3,065,278
PREPARATION OF 1,3-DINITRONAPHTHALENE
Howard L. Cheifetz, Berkeley, Melvin Look, El Cerrito, and James R. McLaughlin, San Francisco, Calif., assignors to Fundamental Research Company, Berkeley, Calif., a partnership
No Drawing. Filed Jan. 11, 1960, Ser. No. 1,447
1 Claim. (Cl. 260—645)

This invention relates to the preparation of 1,3-dinitronaphthalene, a compound which has importance in industrial synthetic organic chemistry, especially as an intermediate in the production of naphthoresorcinol and 1,3-naphthylene diisocyanate.

A principal object of the invention is a novel process for the preparation of 1,3-dinitronaphthalene.

A second object of the invention is a process for the preparation of 1,3-dinitronaphthalene substantially free from other isomers.

Still another object of the invention is a process for the preparation of 1,3-dinitronaphthalene from the Diels-Alder diadduct of hexachlorocyclopentadiene and naphthalene.

These and other objects of the invention and the manner of their accomplishment will be made clear on consideration of this specification and the claim.

There are no known methods of preparing 1,3-dinitronaphthalene by the direct nitration of naphthalene. Although 1,3-dinitrobenzene can be prepared by the direct nitration of benzene or nitrobenzene, the direct nitration of naphthalene, 1-nitronaphthalene, or 2-nitronaphthalene leads invariably to heteronuclear nitration. Contrary references in the older literature (see, for example, R. Pictet, C.r. 116, 815, (1894) or in more recent literature (e.g. Zwicknagel, Explosivstoffe 12, 291, (1958)) are erroneous, as was shown by Fierz-David and Sponagel (Helv. Chim. Acta 26, 98, 1943)).

When required for laboratory purposes, 1,3-dinitronaphthalene has had to be prepared indirectly, generally via Martius Yelloy (2,4-dinitro-1-naphthol), though it has also been prepared from a variety of other starting materials, as for example from 5,7-dinitrotetralin, from 1-chloro-2,4-dinitronaphthalene, or from diazotized 2,4-dinitro-1-naphthylamine. None of these processes appears to be commercially feasible.

The process of our invention for the preparation of 1,3-dinitronaphthalene comprises essentially the further and direct nitration of one of the mononitro compounds of the Diels-Alder diadduct of hexachlorocyclopentadiene and naphthalene of empirical formula, $C_{20}H_8Cl_{12}$, followed by pyrolysis of the dinitrated product. The preparation of the Diels-Alder diadduct referred to is described in the Hyman and Danish U.S. Patent No. 2,658,926. The mononitration of the adduct and the pyrolysis of the nitrated product to yield 2-nitronaphthalene and hexachlorocyclopentadiene are described in the Hyman and Silverman U.S. Patent No. 2,658,913.

We have found that the nitration of the aforesaid Diels-Alder adduct does not result in beta nitration exclusively, but forms also a minor part, about 13 percent, of alpha nitrated product. This alpha nitrated compound may be nitrated a second time with relative ease to form the 1,3-dinitro adduct, which, on pyrolysis, decomposes to yield 2 molecules of hexachlorocyclopentadiene and 1 molecule of 1,3-dinitronaphthalene. The latter product may be distilled under reduced pressure, or by glycerine distillation or the like, or it may be recovered from the still or continuous pyrolytic cracking bottoms, subsequent to cracking, by solvent extraction. The beta-nitronaphthalene (also called 2-nitronaphthalene) diadduct, which forms the major portion of the original nitration product, is essentially unaffected by the dinitration step as here envisaged, or by the subsequent pyrolysis, and may readily be separated from the 1,3-dinitronaphthalene by distillation, selective solvent extraction, or selective reactivity.

The following examples of the preparation and recovery of 1,3-dinitronaphthalene according to the process of our invention are given for the purpose of illustration and not of limitation.

*Example I*

1,3-dinitronaphthalene was prepared from the mononitrated Diels-Alder diadduct of hexachlorocyclopentadiene and naphthalene produced according to Example III of the Hyman and Silverman U.S. Patent No. 2,658,913 previously referred to. As already noted, we have found that the light yellow solid crystalline material produced in accordance with the procedure of that example, and having the empirical formula $C_{20}H_7Cl_{12}NO_2$ consists of about 87 percent of the beta nitro diadduct and about 13 percent of alpha nitro diadduct. 25 parts by weight of the mononitrated mixed product was heated with 80 parts of mixed acid (ca. 50 percent $HNO_3$, 48 percent $H_2SO_4$ and 2 percent $SO_3$) under reflux (90–92° C.) for 2 hours. The mixture was then allowed to cool to room temperature, and 200 parts methylene chloride were added. The mixture was stirred briefly and the organic layer was separated and washed with 100 parts of ice water. The methylene chloride was displaced by dropping the solution into boiling water. The mixture of granular unchanged beta nitro diadduct and newly formed 1,3-dinitro diadduct was collected and dried. (Alternatively, the nitrated diadduct products may be isolated by dropping the nitrated mixture into ice water and then filtering and washing with water.)

The dry mixture of nitrated adduct was cracked at 250–300° C. and 15 mm. pressure. The distillate was triturated and filtered successively with three portions of hot n-hexane or other light aliphatic hydrocarbon solvent, (each portion of 33 parts by weight). 1,3-dinitronaphthalene remained on the filter, while the filtrate contained the unchanged beta nitro adduct together with the hexachlorocyclopentadiene re-formed in the cracking.

*Example II*

In order both to reduce the volume of solid to be handled in the dinitration and subsequent processing, and at the same time to recover most of the beta nitro diadduct separately, for subsequent conversion to beta nitronaphthalene, 300 parts by weight of the mixed beta (87 percent) and alpha (13 percent) mononitrated diadduct were dissolved in 1180 parts of hot acetone. 250 parts of water were added to the hot solution. Crystalline beta nitro diadduct separated and was collected in the amount of 240 parts by weight. By further dilution with water there was precipitated a mononitro adduct mixture containing about 40 percent of the alpha component. The preparation of 1,3-dinitronaphthalene then followed in all respects the procedure described in Example I except that, due to the higher concentration of 1-nitrodiadduct in the starting material, a longer period was required, ranging generally from 3 to 6 hours depending on the concentration of the 1-nitro compound.

*Example III*

Although not generally recommended for large scale production for operating reasons, it is possible to carry out the preparation of the 1,3-dinitro- and the 2-nitrodiadduct simultaneously from the diadduct itself. Thus, for example, 30 parts by weight of the diadduct starting material were nitrated by heating under reflux (90–100° C. in the heating medium) with 88 parts mixed acid (ca. 50 percent $HNO_3$, 48 percent $H_2SO_4$, 2 percent $SO_3$) for two hours. At the end of this time, infra-red spectroscopic examination, which was used to follow the reaction, showed that the formation of the beta-mono nitro- and alpha-dinitro compounds was complete. The reaction mixture was then allowed to cool to room temperature and 200 parts methylene chloride were added and thoroughly mixed. From this point the separation and pyrolytic cracking of the dinitrated diadduct and recovery of the 1,3-dinitronaphthalene proceeded as described in Examples I and II.

In addition to the method of separation described in Example I above, the 1,3-dinitronaphthalene produced according to the process of our invention may be separated in a number of other ways from the other components of the reaction mixtures in which it is found. Distillation under reduced pressure, glycerine distillation, and solvent extraction of still or pyrolytic cracking bottoms have already been mentioned. In addition, we have discovered a unique method of separating 1,3-dinitronaphthalene from 2-nitro-naphthalene after the hexachlorocyclopentadiene has been removed by vacuum distillation. This separation depends on the selective sulfonation of 2-nitronaphthalene, yielding a mixture of sulfonic acids, while the 1,3-dinitronaphthalene is left unaffected. The 6- and 7-nitro-1-naphthalene sulfonic acids thus formed from 2-nitronaphthalene are water soluble, and can therefore be extracted with water. The unreacted 1,3-dinitronaphthalene is precipitated by the water treatment, and may be filtered out or otherwise separated, and, if desired, recrystallized. The sulfonation to effect the separation of the 1,3-dinitronaphthalene from the 2-nitronaphthalene just described may be accomplished very simply, as, for example, by stirring the mixture for 4 to 5 days at room temperature with 20–25 times its weight of 96 percent sulfuric acid, or heating the mixture at 60° C. for 2 to 4 hours, with 10 times its weight of acid. In either case the mixture after sulfonation, and after cooling to room temperature if such cooling is necessary, may be poured into water, and the further separation and recovery operation carried out as already described.

Other modifications of the process of our invention will naturally suggest themselves to one skilled in the chemical arts involved. Except as limited by the claim, such modifications are deemed to be comprehended within the scope of this invention.

We claim:

The 1,3-dinitro derivative of the adduct of one mole of naphthalene and two moles of hexachlorocyclopentadiene, said derivative having the property of cracking at temperature-pressure conditions on the order of 250–300° C. and 15 mm. to produce hexachlorocyclopentadiene and 1,3-dinitronaphthalene.

References Cited in the file of this patent

UNITED STATES PATENTS

| | | |
|---|---|---|
| 1,581,258 | Whittaker | Apr. 20, 1926 |
| 2,040,123 | Coward | May 12, 1936 |
| 2,643,271 | Taylor et al. | June 23, 1953 |
| 2,658,913 | Hyman et al. | Nov. 10, 1953 |

OTHER REFERENCES

Nitration of Hydrocarbons and Other Organic Compounds, by A. V. Topchiev et al., Pergamon Press, N.Y., 1959, pp. 27, 237, 238.